United States Patent

[11] 3,614,129

| [72] | Inventor | William J. Sobkow<br>Livonia, Mich. |
|---|---|---|
| [21] | Appl. No. | 861,854 |
| [22] | Filed | Sept. 29, 1969 |
| [45] | Patented | Oct. 19, 1971 |
| [73] | Assignee | Ford Motor Company<br>Dearborn, Mich. |

[54] VEHICLE PASSENGER RESTRAINT ARRANGEMENT INCLUDING A COMPARTMENTALIZED AIR BAG
2 Claims, 5 Drawing Figs.

[52] U.S. Cl. .................................... 280/150 AB, 180/90, 244/121
[51] Int. Cl. .................................... B60r 21/04
[50] Field of Search .................................... 280/150 AB, 150 B; 180/90; 296/70, 84 K, 97 (.56); 244/121; 52/2

[56] References Cited
UNITED STATES PATENTS

| 2,418,798 | 4/1967 | Whitmer | 244/121 |
| 3,130,807 | 4/1964 | McHenry | 280/150 AB X |
| 3,172,684 | 3/1965 | Issac | 280/150 AB |
| 3,451,694 | 6/1969 | Hass | 280/150 AB |
| 3,468,556 | 9/1969 | Smith | 280/150 B |

FOREIGN PATENTS

| 388,793 | 6/1965 | Switzerland | 296/97 (.56) |

Primary Examiner—Benjamin Hersh
Assistant Examiner—John A. Pekar
Attorneys—John R. Faulkner and E. Dennis O'Connor ABSTRACT: A motor vehicle passenger restraint arrangement including an air bag divided into compartments and adapted to be impacted by the body of a vehicle passenger during periods of rapid vehicle deceleration. These compartments are of various sizes with large compartments positioned to be impacted by parts of the body of the passenger having relatively large areas such as the chest. Small compartments are positioned to be impacted by body areas having relatively small areas such as the knees. This arrangement of compartments provides that the resistance to passenger movement offered by the air bag when the bag is deformed due to impact thereupon substantially is equalized regardless of the area of the impacting body part.

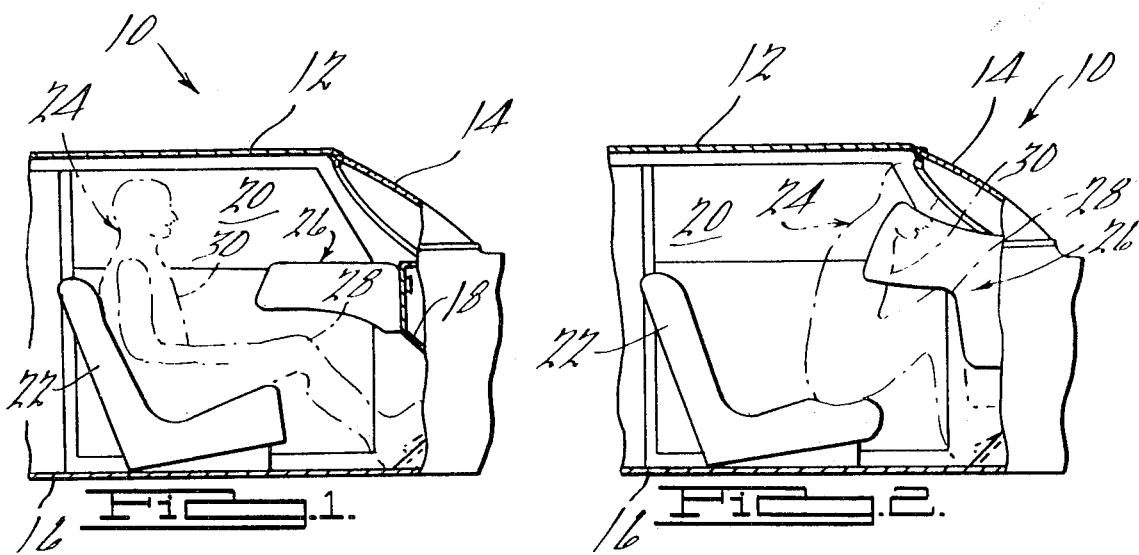
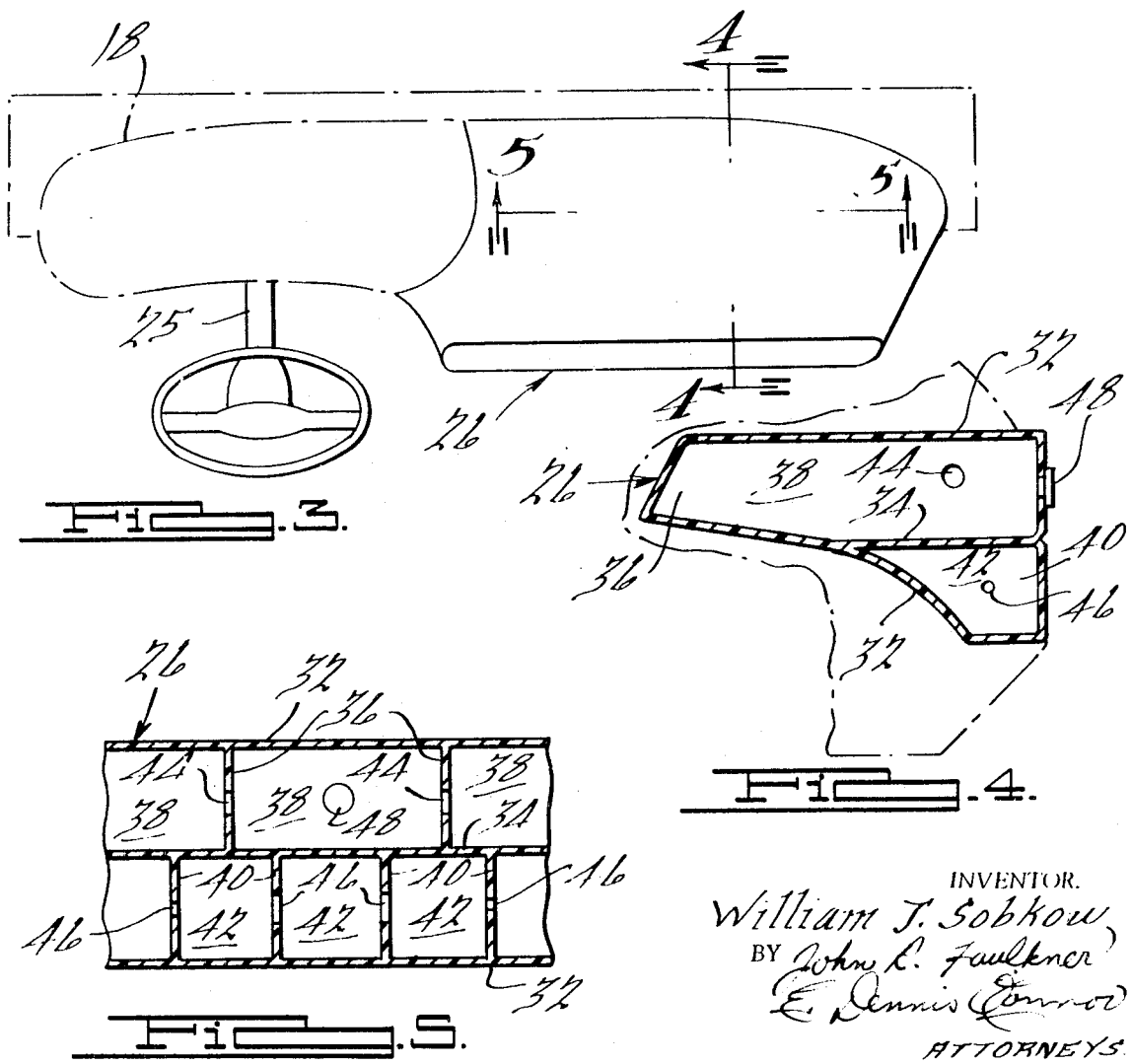

3,614,129

VEHICLE PASSENGER RESTRAINT ARRANGEMENT INCLUDING A COMPARTMENTALIZED AIR BAG

BACKGROUND OF THE INVENTION

The prior art teaches the use of both dynamic and static air bags to restrain a motor vehicle passenger during periods of rapid vehicle deceleration such as occur during a vehicle collision. (Although the term "air bag" has gained acceptance in the art, it is understood that the bag so utilized may contain air or gases other than air.) Dynamic bags are inflated rapidly by a pressurized gas due to some external stimulus such as rapid deceleration of the vehicle. Static bags normally contain a predetermined volume of the gas at atmospheric or a higher pressure and are designed as part of the vehicle body elements that define the confines of the passenger compartment.

Both dynamic and static air bags restrain passenger movement following impact between the body of the passenger and the bag due to the pressurization of the gas entrapped within the bag. Of course, the pressure of this gas is increased as the closed bag is deformed when the passenger's body impacts against it. In the past, the design of air bag arrangements has proven difficult because body parts of varying areas will impact against the bags at various times. For example, tests have shown that as a seated vehicle passenger moves forward against an air bag, the passenger's knees, having a relatively small impact area, first will contact the bag, followed by contact with such relatively large body areas as the chest.

It has been found that it is difficult to vary such parameters as initial bag pressure, bag size and bag shape so that the pressures present within the bag during bag deformation will accommodate impacting body elements of varying sizes. For instance, it has been found that a bag pressure sufficient to prevent excessive penetration of the bag by a relatively pointed knee may be too high to provide sufficient cushioning of the chest area. Conversely, if the chest properly is cushioned, the relatively low bag pressure may allow the knee to penetrate to an extent that it impacts structural members located behind the bag.

It is an object of this invention to provide an air bag arrangement for restraining motor vehicle passengers wherein these difficulties are obviated. This is accomplished by providing an air bag that tends to equalize the resistance to bag deformation as the bag is impacted by body parts having varying impact areas.

SUMMARY OF THE INVENTION

A passenger restraint arrangement according to this invention is adapted for use in a motor vehicle having body structure defining a passenger compartment and a forward facing passenger seat located within this compartment. The restraint arrangement includes a deformable air bag adapted to be positioned forwardly of a passenger supported on the seat and to be impacted by and to restrain movement of this passenger during rapid vehicle deceleration. The air bag includes flexible wall means dividing the interior of the bag into a plurality of compartments. A first group of these compartments is located generally forward of the knees and lower torso of the seated passenger. A second group of the compartments is located generally forward of the chest of the seated passenger. The compartments of the second group are larger in volume than the compartments of the first group. The pressure within the air bag prior to impact thereupon may be either atmospheric pressure or a greater pressure.

DESCRIPTION OF THE DRAWING

FIG. 1 is a side elevation view, with parts broken away and parts in section, of a motor vehicle passenger compartment including a vehicle passenger restraint arrangement according to this invention;

FIG. 2 is a view similar to FIG. 1 but illustrating a vehicle passenger impacting the passenger restraint arrangement;

FIG. 3 is a plan view of that portion of the passenger compartments of FIGS. 1 and 2 that includes the passenger restraint arrangement;

FIG. 4 is a sectional view taken along the line 4—4 of FIG. 3; and

FIG. 5 is a partial sectional view taken along the line 5—5 of FIG. 3.

DETAILED DESCRIPTION OF THE INVENTION

Referring now in detail to the drawing and in particular to FIGS. 1 to 3 thereof, the numeral 10 denotes generally a motor vehicle having a roof 12, a windshield 14, a floor member 16 and an instrument panel 18. These elements cooperate to define a passenger compartment 20. Within passenger compartment 20, a forward-facing passenger seat 22 is secured to the floor member 16. In FIG. 1, a vehicle passenger 24 is illustrated seated in a normal position on seat 22 and supported thereby.

Secured to the instrument panel 18 to the right of the vehicle steering column 25, (FIG. 3) is a static air bag 26 that will be described in greater detail below. The purpose of air bag 26 is to restrain forward movement of passenger 24. The position of the vehicle passenger 24 when he is restrained by the air bag 26 is illustrated in FIG. 2 of the drawing. It may be seen from FIG. 2 that an otherwise unrestrained passenger, such as passenger 24, moves forward during rapid deceleration with the passenger's knees 28 first contacting the lower portion of air bag 26. Following impact between the passenger's knees and the air bag, the chest 30 of the passenger will impact against the upper portion of the air bag. As will be described in greater detail below, the impacts between the various parts of the passenger's body and the air bag cause deformation of the air bag and a rise in the internal pressure thereof such that the air bag offers sufficient resistance to the movement of the passenger.

The details of the construction of air bag 26 may be appreciated by reference to FIGS. 4 and 5 of the drawing. It should be noted that the air bag 26 illustrated is the static-type air bag that normally is in an inflated position with the internal pressure equal to or slightly greater than atmospheric pressure. It readily may be appreciated, however, as this description proceeds, that the principles of this invention also may be applied to the so-called dynamic air bag that is inflated in response to an external stimulus.

Air bag 26 is formed with an external skin 32 comprising a somewhat flexible and deformable material. Although the air bag 26 illustrated retains the shape illustrated in the drawings because the material of outer skin 32 will support its own weight, it readily may be appreciated that such an air bag may derive its shape from the fact that it is filled with a very low density, open-celled foam such as a polyurethane foam.

The air bag chamber defined by the outer skin 32 is divided into upper and lower portions by a horizontal divider 34. Located above the horizontal divider 34 and extending between divider 34 and skin 32 are a plurality of upper, vertical dividers 36 that partition that portion of the air bag chamber above the horizontal divider 32 into a plurality of compartments 38. Below the horizontal divider 34 and extending between the horizontal divider and the outer skin 32 are a plurality of lower, vertical dividers 40 that partition that portion of the air bag chamber below the horizontal divider 34 into a plurality of compartments 42. As readily may be appreciated from FIG. 5, compartments 38 are substantially larger in volume than compartments 42. The significance of this will be explained below.

In the air bag 26 illustrated, horizontal divider 34 and vertical dividers 36 and 40 integrally are formed from the same material as the outer skin 32. Of course, it is possible to construct a static air bag such as bag 26 with these dividing members being separate entities from both the outer skin of the air bag and each other.

Each of the compartments defined within the air bag 26 is interconnected with another of these compartments. As may be seen in FIG. 5, each of the lower compartments 42 is interconnected with at least one of the other compartments 42 by openings 46 that extend through dividers 40. In like manner, upper chambers 38 are interconnected by openings 44 extending through upper vertical dividers 36. The sizes of the apertures 44 and 46 need not be uniform. Variences in the sizes of these apertures may be included in the design of the air bag 26 in order to regulate the pressure buildups in the various compartments during impact between the passenger 24 and the air bag 26. The need for such variences and the particulars thereof easily may be determined empirically once the precise details of use of an air bag arrangement is determined.

That portion of air bag 26 above the horizontal divider 34 is illustrated as being vented to the atmosphere through a pressure release valve 48 of any conventional design. The valve 48 effectively limits the pressure in compartments 38 by allowing air to bleed from these compartments to the atmosphere whenever the pressure in the compartments reaches a predetermined level. Although no such valve is shown venting that portion of the air bag chamber located below the horizontal divider 34, such a valve may be provided if it is determined empirically that such a valve is advantageous for the particular performance characteristics of the air bag that are desired. Also, although the drawings do not illustrate apertures extending through horizontal divider 34 and interconnecting the upper and lower compartments 38 and 42 respectively, such apertures may be included if desired for a particular air bag utilization.

The air bag 26 is positioned within the passenger compartment 20 such that the smaller, lower compartments 42 are located generally forward of the knees 28 of the passenger when the passenger is seated in a normal position as illustrated in FIG. 1. The upper compartments 38 then are positioned generally forward of the chest area of the passenger.

Upper compartments 38 are larger than lower compartments 42 because the impact area of the chest 30 is larger than the impact area of the knees 28. As the passenger 24 moves forward during rapid vehicle deceleration, initially the knees 28 will impact against that portion of the outer skin 32 of air bag 26 that defines lower chambers 42. Although the impact areas of the knees are small with a corresponding relatively small deformation of compartments 42, the pressure within compartments 42 quickly will become elevated to a sufficient extent to cushion the knees 28 and prevent the knees from impacting against structure located forward of air bag 26 such as the instrument panel 18. This rapid pressurization of small compartments 42, despite the relatively small deformation of the surrounding air bag material, is due, of course, to the well-known gas law commonly called Boyle's Law that states that the volume of a gas varies inversely with the pressure to which it is subjected.

Following the impact between the knees 28 and air bag 26, the relatively large chest area 30 will impact against the upper portion of the air bag, on that portion of outer skin partially defining the upper compartments 38. Since the upper compartments 38 are relatively large, it requires a relatively large deformation to cause sufficient pressurization of these compartments to sufficiently cushion the chest of the passenger. The deformation caused by the impact of the chest against the air bags causes such a large deformation and subsequent pressurization. The pressure buildup in compartment 38 is limited, of course, by the pressure relief valve 48 that admits air to the atmosphere from the compartments 38. This bleeding of air to the atmosphere upon a certain predetermined pressure being reached prevents deleterious rebounding of the vehicle passenger following a termination of his forward movement.

It thus may be seen that this invention provides a vehicle passenger restraint arrangement including an air bag 26 in which are defined compartments of various sizes that are positioned to be impacted by body parts having corresponding sizes. Small impact area body parts such as the knees impact against relatively small compartments in the air bag, while relatively large impact areas of the body such as the chest impact relatively large air bag compartments. In this manner, air bag design problems greatly are simplified since the requisite cushioning pressures for various body parts easily may be achieved with air bags having overall dimensions and sizes of great variance.

I claim:

1. A passenger restraint arrangement for a motor vehicle having body structure defining a passenger compartment and a forward-facing passenger seat located within said compartment, said arrangement including a deformable air bag adapted to be positioned forwardly of a seated passenger supported on said seat and to be impacted by and to restrain movement of said passenger during rapid vehicle deceleration, said air bag including flexible wall means for dividing said bag into a plurality of compartments, a first group of said compartments being located generally forward of the knees and lower torso of said seated passenger, a second group of said compartments being located generally forward of the upper torso of said seated passenger, the compartments of said second group being larger in volume than the compartments of said first group, and each of said compartments being interconnected with at least one other compartment by apertures formed through said flexible wall means between adjacent compartments.

2. The passenger restraint arrangement of claim 1, wherein the pressure within said air bag normally is atmospheric pressure, said bag being deformed and the pressure therein increased due to impact thereon by said passenger, and a pressure relief valve venting said air bag to the atmosphere and limiting the pressure buildup within said bag due to bag deformation.